United States Patent
Fan et al.

(10) Patent No.: US 12,554,628 B2
(45) Date of Patent: Feb. 17, 2026

(54) SMART CASE EXECUTION PRIORITY EVALUATION MECHANISM

(71) Applicant: Dell Products L.P., Round Rock, TX (US)

(72) Inventors: Huijuan Fan, Chengdu (CN); Changxu Jiang, Chengdu (CN); Bob Biao Yan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 18/388,897

(22) Filed: Nov. 13, 2023

(65) Prior Publication Data

US 2025/0123949 A1    Apr. 17, 2025

(30) Foreign Application Priority Data

Oct. 11, 2023 (CN) .......................... 202311312437.4

(51) Int. Cl.
 *G06F 11/3668* (2025.01)

(52) U.S. Cl.
 CPC ................................ *G06F 11/3688* (2013.01)

(58) Field of Classification Search
 None
 See application file for complete search history.

(56) References Cited

U.S. PATENT DOCUMENTS

| | | | |
|---|---|---|---|
| 11,797,735 B1 * | 10/2023 | Gommershtadt | G06N 20/00 |
| 2006/0168565 A1 * | 7/2006 | Gamma | G06F 11/3688 |
| | | | 717/122 |
| 2021/0303442 A1 * | 9/2021 | Chenguttuvan | G06N 3/09 |
| 2025/0123949 A1 * | 4/2025 | Fan | G06F 11/3688 |

FOREIGN PATENT DOCUMENTS

CN    112948274 A  *  6/2021  .......... G06F 11/3684

OTHER PUBLICATIONS

Biswas, "Regression Test Selection Techniques: A Survey", 2010, Dept. of Computer Science and Engineering, IIT Kharagpur, India (Year: 2010).*

* cited by examiner

*Primary Examiner* — Hossain M Morshed
(74) *Attorney, Agent, or Firm* — Krishnendu Gupta; Lesley Leonessa

(57) ABSTRACT

Methods, system, and non-transitory processor-readable storage medium for a test selection system are provided herein. An example method includes selecting, by a test selection system, a regression test case from a plurality of regression test cases in a software testing lifecycle system. The test selection system calculates a fault detection score for the regression test case, based on a fault detection decay rate score associated with the regression test case. The test selection system selects the regression test case for execution on a test system based on the fault detection score, and executes the regression test case on the test system.

20 Claims, 4 Drawing Sheets

SMART CASE EXECUTION PRIORITY EVALUATION MECHANISM

FIELD

The field relates generally to optimizing selection of regression test cases in information processing systems.

BACKGROUND

System test is a critical part of the pre-release quality engineering activities for information processing systems. There are two important parts of the system test phase; new feature tests and regression test cases. There may be thousands of system regression test cases for complicated information processing systems, such as storage products.

SUMMARY

Illustrative embodiments provide techniques for implementing a test selection system in a storage system. For example, illustrative embodiments select, by a test selection system, a regression test case from a plurality of regression test cases in a software testing lifecycle system. The test selection system calculates a fault detection score for the regression test case, based on a fault detection decay rate score associated with the regression test case. The test selection system selects the regression test case for execution on a test system based on the fault detection score and executes the regression test case on the test system. Other types of processing devices can be used in other embodiments. These and other illustrative embodiments include, without limitation, apparatus, systems, methods and processor-readable storage media.

DETAILED DESCRIPTION

Figure 1:
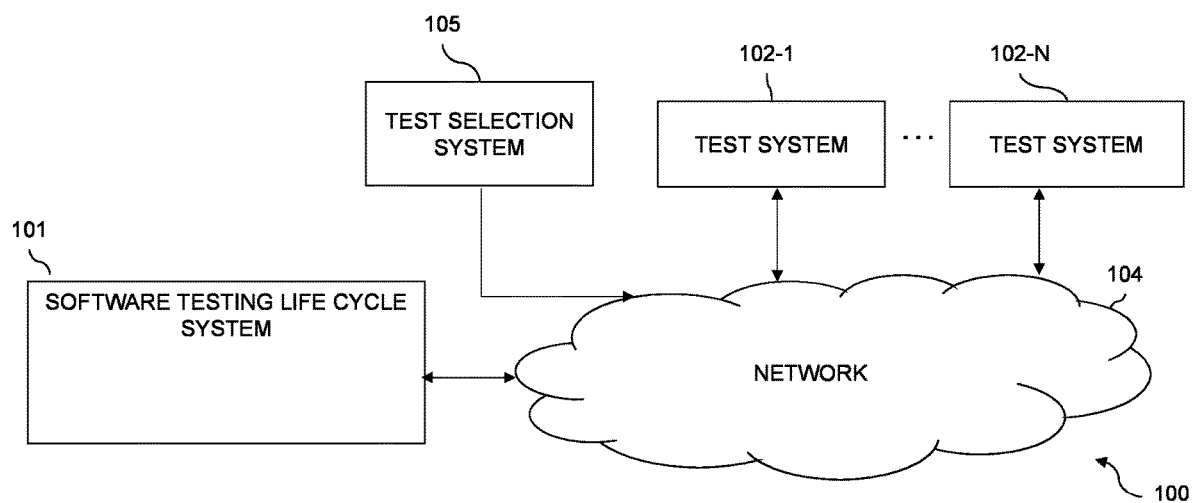
FIG. 1 shows an information processing system including a test selection system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a test selection system, which technique may be used to provide, among other things regression test case selection and optimization by selecting, by a test selection system, a regression test case from a plurality of regression test cases in a software testing lifecycle system. The test selection system calculates a fault detection score for the regression test case, based on a fault detection decay rate score associated with the regression test case. The test selection system selects the regression test case for execution on a test system based on the fault detection score and executes the regression test case on the test system.

The system test phase of the pre-release quality engineering activities for information processing systems may comprise thousands of regression test cases. Regression test cases must be executed to ensure that newly implemented features do not impact existing functionality. Yet, resources to execute those regression test cases may be limited. Therefore, it is crucial to execute the most valuable regression test cases (i.e., those regression test cases considered to be of higher importance than other regression test cases) first when executing the test suite of regression test cases. Execution of the most valuable regression test cases earlier in the testing cycle results in the detection of more critical issues earlier in the testing phase.

Conventional technologies only consider the number of detected faults (and the priority associated with the detected faults) that are linked to a regression test case without taking into account how much time has passed since the regression test case initially detected those faults. Software products often have many updates and modifications over the course of time. A critical "bug" detected in an older release is typically no longer an issue in more current releases since the detected critical "bug" is addressed once detected and fixed in the new product architecture. Conventional technologies do not value more recently detected faults higher than older detected issues. Conventional technologies do not provide a more optimal regression test case execution schedule by balancing how recently regression test cases have detected faults and the priority associated with those detected faults, to provide an optimal testing schedule, maximizing the regression test cases' effectiveness and efficiency to achieve the overall goal of providing the most robust product to the customer. Conventional technologies do not provide a way to select the best regression test cases to adequately provide regression testing coverage of the new features in the new product releases, especially when resources are limited. Regression test teams may not have the bandwidth to rerun the full set of regression test cases for new product releases.

By contrast, in at least some implementations in accordance with the current technique as described herein, regression test case selection is optimized by selecting, by a test selection system, a regression test case from a plurality of regression test cases in a software testing lifecycle system. The test selection system calculates a fault detection score for the regression test case, based on a fault detection decay rate score associated with the regression test case. The test selection system selects the regression test case for execution on a test system based on the fault detection score and executes the regression test case on the test system.

Thus, a goal of the current technique is to provide a method and a system for a test selection system that can evaluate the value of regression test cases, rank the regression test cases according to their respective values, and execute the regression test cases in order of value. Another goal is to consider the number of detected faults and the priority associated with the detected faults that are linked to a regression test case, taking into account how much time has passed since the regression test case initially detected those faults. Another goal is to value more recently detected faults higher than older detected issues. Yet another goal is to provide a more optimal regression test case execution schedule by balancing how recently regression test cases have detected faults and the priority associated with those detected faults, to provide an optimal testing schedule, maximizing the regression test cases' effectiveness and efficiency to achieve the overall goal of providing the most robust product to the customer.

In at least some implementations in accordance with the current technique described herein, the use of a test selection system can provide one or more of the following advantages: provide a method and a system for a test selection system that can evaluate the value of regression test cases, rank the regression test cases according to their respective values, and execute the regression test cases in order of value, consider the number of detected faults and the priority associated with the detected faults that are linked to a regression test case, taking into account how much time has passed since the regression test case initially detected those faults, value more recently detected faults higher than older detected issues, and provide a more optimal regression test case execution schedule by balancing how recently regression test cases have detected faults and the priority associated with those detected faults, to provide an optimal testing schedule, maximizing the regression test cases' effectiveness and efficiency to achieve the overall goal of providing the most robust product to the customer.

In contrast to conventional technologies, in at least some implementations in accordance with the current technique as described herein, regression test case selection is optimized by selecting, by a test selection system, a regression test case from a plurality of regression test cases in a software testing lifecycle system. The test selection system calculates a fault detection score for the regression test case, based on a fault detection decay rate score associated with the regression test case. The test selection system selects the regression test case for execution on a test system based on the fault detection score and executes the regression test case on the test system.

In an example embodiment of the current technique, a previous execution of the regression test case on a first system detected at least one fault on the first system.

In an example embodiment of the current technique, the test selection system assigns the regression test case to a first priority plurality of regression test cases if the regression test case is associated with a new feature fault detection tag and assigns the regression test case to a second priority plurality of regression test cases if the regression test case is not associated with the new feature fault detection tag.

In an example embodiment of the current technique, the test selection system determines a plurality of detected faults associated with the regression test case and calculates the fault detection score using the plurality of detected faults.

In an example embodiment of the current technique, the plurality of detected faults is associated with a validation period.

In an example embodiment of the current technique, the test selection system calculates the fault detection decay rate score for each of the plurality of detected faults.

In an example embodiment of the current technique, the test selection system calculates the fault detection decay rate score for at least one priority associated with each of the plurality of detected faults.

In an example embodiment of the current technique, the test selection system calculates the fault detection decay rate score for each priority associated with each of the plurality of detected faults.

In an example embodiment of the current technique, the test selection system calculates the fault detection decay rate score using Newton's Law of Cooling.

In an example embodiment of the current technique, the test selection system calculates the fault detection decay rate score using a validation period associated with the plurality of detected faults.

In an example embodiment of the current technique, the test selection system determines a fault detection time decay factor for each of the plurality of detected faults.

In an example embodiment of the current technique, the test selection system determines a summation of the fault detection time decay factor for each of the plurality of detected faults to determine the fault detection score for the regression test case.

In an example embodiment of the current technique, the test selection system ranks a first priority plurality of regression test cases according to a respective fault detection score associated with each of the first priority plurality of regression test cases to determine an execution priority associated with each of the first priority plurality of regression test cases.

In an example embodiment of the current technique, the test selection system ranks a second priority plurality of regression test cases according to a respective fault detection score associated with each of the second priority plurality of regression test cases to determine an execution priority associated with each of the second priority plurality of regression test cases.

In an example embodiment of the current technique, the test selection system executes a first priority plurality of regression test cases according to an execution priority associated with each of the first priority plurality of regression test cases and upon completion of the execution of the first priority plurality of regression test cases, executes a second priority plurality of regression test cases according to an execution priority associated with each of the second priority plurality of regression test cases.

In an example embodiment of the current technique, the first priority plurality of regression test cases is associated with a first validation period and the second priority plurality of regression test cases is associated with a second validation period.

In an example embodiment of the current technique, the first validation period is different from the second validation period.

In an example embodiment of the current technique, the execution priority associated with each of the first priority plurality of regression test cases optimizes efficient fault detection on the test system.

FIG. 1 shows a computer network (also referred to herein as an information processing system) 100 configured in accordance with an illustrative embodiment. The computer network 100 comprises a software testing life cycle system 101, test selection system 105, and test systems 102-N. The software testing life cycle system 101, test selection system 105, and test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a test selection system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the test selection system 105 are one or more input-output devices, which illustratively comprise keyboards, displays or other types of input-output devices in any combination. Such input-output devices can be used, for example, to support one or more user interfaces to the test selection system 105, as well as to support communication between the test selection system 105 and other related systems and devices not explicitly shown. For example, a dashboard may be provided for a user to view a progression of the execution of the test selection system 105. One or more input-output devices may also be associated with any of the test systems 102-N.

Additionally, the test selection system 105 in the FIG. 1 embodiment is assumed to be implemented using at least one processing device. Each such processing device generally comprises at least one processor and an associated memory, and implements one or more functional modules for controlling certain features of the test selection system 105.

More particularly, the test selection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the test selection system 105 to communicate over the network 104 with the software testing life cycle system 101, and test systems 102-N and illustratively comprises one or more conventional transceivers.

A test selection system 105 may be implemented at least in part in the form of software that is stored in memory and executed by a processor, and may reside in any processing device. The test selection system 105 may be a standalone plugin that may be included within a processing device.

It is to be understood that the particular set of elements shown in FIG. 1 for test selection system 105 involving the software testing life cycle system 101, and test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the test selection system 105 can be on and/or part of the same processing platform.

An exemplary process of test selection system 105 in computer network 100 will be described in more detail with reference to, for example, the flow diagram of FIG. 2.

Figure 2:
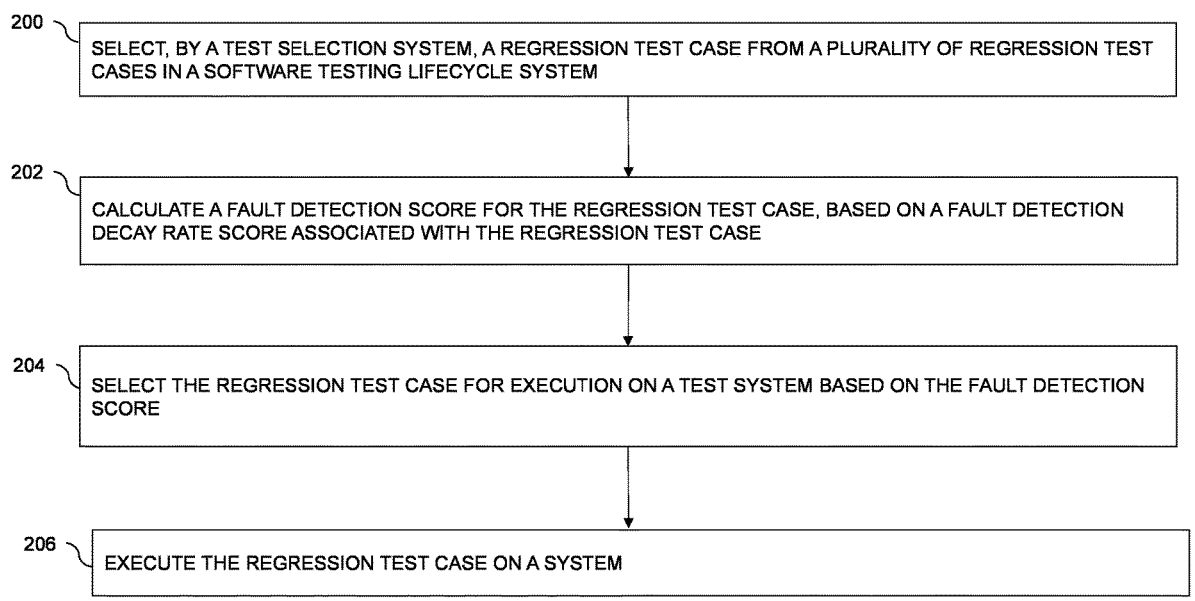
FIG. 2 shows a flow diagram of a process for a test selection system in an illustrative embodiment.

FIG. 2 is a flow diagram of a process for execution of the test selection system 105 in an illustrative embodiment. It is to be understood that this particular process is only an example, and additional or alternative processes can be carried out in other embodiments.

At 200, the test selection system 105 selects a regression test case from a plurality of regression test cases in a software testing lifecycle system. In an example embodiment, a previous execution of the regression test case on a first system detected at least one fault on the first system. In other words, the regression test case is associated with detected faults, or "bugs". In an example embodiment, the test selection system 105 will individually select each regression test case from the plurality of regression test cases to evaluate each regression test case to identify the optimal order of execution of the regression test cases for each product release.

At 202, the test selection system 105 calculates a fault detection score for the regression test case, based on a fault detection decay rate score associated with the regression test case. In an example embodiment, the plurality of regression test cases is filtered into two categories according to whether there is a "new feature" tag associated with the regression test case. In an example embodiment, the test selection system 105 assigns the regression test case to a first priority plurality of regression test cases if the regression test case is associated with a new feature fault detection tag, and assigns the regression test case to a second priority plurality of regression test cases if the regression test case is not associated with the new feature fault detection tag. The first priority plurality of regression test cases is associated with new features and the second priority plurality of regression test cases is associated with legacy features.

In an example embodiment, the test selection system 105 determines a plurality of detected faults associated with the regression test case, and calculates the fault detection score using the plurality of detected faults. In an example embodiment, the plurality of detected faults is associated with a validation period. For example, the test selection system 105 collects the detected faults associated with a regression test case that were detected during a validity period.

In an example embodiment, the test selection system 105 calculates the fault detection decay rate score for each of the plurality of detected faults. In an example embodiment, to evaluate the detected fault's value to the regression test case, the test selection system 105 determines the decay rate for the detected fault as time goes on. In other words, the value of a detected fault is high when the regression test case initially detects the fault, but lessens as time goes on, because the detected fault may be fixed in subsequent releases. In an example embodiment, the test selection system 105 calculates the fault detection decay rate score using Newton's Law of Cooling.

Newton's Law of Cooling is an exponential decay model, and determines the temperature of a cooling or warming object, based on the temperature of the surroundings and the time passed since the object entered the surroundings. The detected faults may also be associated with a temperature where detected faults that were detected recently have higher importance (or value) to the regression test case than detected faults that were detected earlier than the more recently detected faults.

In an example embodiment, "T" represents the temperature of a detected fault where the temperature belongs to the set of [1, 100], $T_{t_0}$ represents the detected fault's initial temperature, and $T_t$ represents the detected fault's temperature at time t. The fault detection decay rate score k is determined from historical records associated with the regression test case and associated detected faults. Thus, the fault detection decay rate score is determined using the following formula:

$$T_t = T_{t_0} \times e^{-k(t-t_0)}$$

In an example embodiment, the test selection system 105 calculates the fault detection decay rate score using a validation period associated with the plurality of detected faults. For example, the validation period is 2 years and the detected fault's temperature will decay to 1 after 2 years.

In an example embodiment, a detected fault has a priority attribute that reflects the importance of the detected fault. For example, P0 indicates a critical detected fault, P1 indicates an important detected fault, and P2 indicates a low impact detected fault. In an example embodiment, the test selection system 105 calculates the fault detection decay rate score for at least one priority associated with each of the plurality of detected faults. In an example embodiment, the initial detected faults' temperature generated 2 years ago are {100, 85, 70} corresponding to the respective priorities {P0, P1, P2} associated with those detected faults. The current temperature of those detected faults $T_{now}=1$. Thus, the fault detection decay rate score k for a detected fault with priority P0 is:

$$T_{now} = T_{24 \text{ months ago}} \times e^{-k_{P0} \cdot 24 \text{ months}}$$

$$1 = 100 \times e^{-24 \cdot k_{P0}}$$

$$k_{P0} = 0.1919$$

In an example embodiment, the test selection system 105 calculates the fault detection decay rate score for each priority associated with each of the plurality of detected faults. Thus, the fault detection decay rate score k for a detected fault with priority P1 is $k_{P1}=0.1851$, and the decay rate k for a detected fault with priority P2 is $k_{P2}=0.1770$.

In an example embodiment, the test selection system 105 determines a fault detection time decay factor $\lambda(t, Pi)$ for each of the plurality of detected faults. For example, the fault detection time decay factor may be determined as follows:

$$\lambda(t, Pi) = \frac{T_t}{T_{t_0}} = e^{-k_{Pi}(t-t_0)}$$

In an example embodiment, the test selection system 105 determines a summation of the fault detection time decay factor for each of the plurality of detected faults to determine the fault detection score for the regression test case. The fault detection score may be determined as follows:

$$S_{casej} = \sum_{case\ j\ detected\ faults} \lambda(t_i Pi) \cdot T_{t_0}$$

$$= \sum_{case\ j\ detected\ faults} e^{-k_{Pi}(t-t_0)} \cdot T_{t_0}$$

Thus, the fault detection decay rate score is determined for each of the detected faults associated with, for example, regression test case j, and using the fault detection decay rate score, the fault detection time decay factor is determined. A summation of all the fault detection time decay factors associated with regression test case j yields the fault detection score for regression test case j. In an example embodiment, a high fault detection decay rate score indicates the regression test case is associated with recently detected faults that are considered to be "high quality bugs".

At 204, the test selection system 105 selects the regression test case for execution on a test system based on the fault detection score. In an example embodiment, the test selection system 105 determines all the detected faults (during the validity period) associated with each regression test case in the first priority plurality of regression test cases, and calculates the fault detection score for each regression test case. In an example embodiment, the test selection system 105 ranks the first priority plurality of regression test cases according to the respective fault detection score (for example, highest to lowest) associated with each of the first priority plurality of regression test cases to determine an execution priority associated with each of the first priority plurality of regression test cases. The execution priority results in the more valuable regression test cases executed before the less valuable regression test cases. The test selection system 105 outputs the first priority plurality of regression test cases execution order.

In an example embodiment, the test selection system 105 determines all the detected faults (during the validity period) associated with each regression test case in the second priority plurality of regression test cases, and calculates the fault detection score for each regression test case. In an example embodiment, the test selection system 105 ranks the second priority plurality of regression test cases according to the respective fault detection score associated with each of the second priority plurality of regression test cases to determine an execution priority associated with each of the second priority plurality of regression test cases. The test selection system 105 outputs the second priority plurality of regression test cases execution order. For example, the test selection system 105 may rank the regression test cases in the first priority plurality of regression test cases according to the highest fault detection score to the lowest fault detection score, and then rank the regression test cases in the second priority plurality of regression test cases according to the highest fault detection score to the lowest fault detection score.

At 206, the test selection system 105 executes the regression test case on the test system. In an example embodiment, the test selection system 105 executes the first priority plurality of regression test cases according to an execution priority associated with each of the first priority plurality of regression test cases, and upon completion of the execution of the first priority plurality of regression test cases, the test selection system 105 executes a second priority plurality of regression test cases according to the execution priority associated with each of the second priority plurality of regression test cases. In other words, the test selection system 105 ranks the first priority plurality of regression test cases according to the respective fault detection scores associated with those regression test cases, and executes the first priority regression test cases according to the order in which the regression test cases rank. The execution priority associated with each of the first priority plurality of regression test cases optimizes efficient fault detection on the test system, meaning the more valuable regression test cases, likely to detect critical faults (i.e., "bugs"), are executed first, and the remaining regression test cases in the first priority plurality of regression test cases are executed in order according to the value of the detected "bugs" associated with each of the first plurality of regression test cases. Once completed, the test selection system 105 executes the second priority plurality of regression test cases according to the order in which the second priority plurality of regression test cases are ranked. Thus, the regression test cases that are associated with higher valued detected faults are given more importance during evaluation, and are executed earlier in the test period. This provides the software developers tasked with resolving the detected faults earlier notification of the detected faults, and provides the developers with adequate time to determine the root cause of the detected faults and to resolve the detected faults. This helps to avoid project release delays caused by critical bug fixes.

In an example embodiment, the first priority plurality of regression test cases is associated with a first validation period and the second priority plurality of regression test cases is associated with a second validation period. In another example embodiment, the first validation period is different from the second validation period.

In an example embodiment, there are 185 regression test cases that are scheduled for execution. The test selection system 105 determines the order in which the regression test cases are to be executed to ensure the most important regression test cases are executed sooner than other less important regression test cases. The test selection system 105 determines whether each of the 185 regression test cases {regression test case1, . . . , regression test case185} is associated with a new feature fault detection tag, and classifies the regression test cases into either the first priority plurality of regression test cases (if associated with the new feature fault detection tag) or the second priority plurality of regression test cases (if not associated with the new feature fault detection tag). For example, the first priority plurality of regression test cases includes 35 regression test cases {regression test case$_1$, regression test case$_4$, regression test case$_7$, . . . , regression test case$_j$, . . . , regression test case$_{184}$} and the second priority plurality of regression test cases includes 150 cases {regression test case$_2$, regression test case$_3$, regression test case$_5$, . . . , regression test case$_k$, . . . , regression test case$_{185}$}. The test selection system 105 determines the plurality of detected faults for each of the 35 regression test cases in the first priority plurality of regression test cases within a validity period of 24 months, and then calculates the fault detection score for each of the 35 regression test cases {S$_{regression\ test\ case1}$, S$_{regression\ test\ case4}$, S$_{regression\ test\ case7}$, . . . , S$_{regression\ test\ casej}$, . . . S$_{regression\ test\ case184}$}. The test selection system 105 determines the execution priority for the 35 first priority plurality of regression test cases by ranking the regression test cases {S$_{regression\ test\ case1}$, S$_{regression\ test\ case184}$, . . . , S$_{regression\ test\ casej}$, . . . S$_{regression\ test\ case7}$, S$_{regression\ test\ case4}$}. The test selection system 105 determine the plurality of detected faults for each of the 150 regression test cases in the second plurality of regression test cases within a validity period of 24 months, and then calculates the fault detection score for each of the 150 regression test cases {S$_{regression\ test\ case2}$, S$_{regression\ test\ case3}$, S$_{regression\ test\ case5}$, . . . , S$_{regression\ test\ casek}$, . . . , S$_{regression\ test\ case185}$}. The test selection system 105 determines the execution priority for the 150 second priority plurality of regression test cases by ranking the regression test cases {S$_{regression\ test\ case5}$, S$_{regression\ test\ case3}$, S$_{regression\ test\ case185}$, . . . , S$_{regression\ test\ casek}$, . . . S$_{regression\ test\ case2}$}. The test selection system 105 then executes the 185 regression test cases according to the execution priorities {S$_{regression\ test\ case1}$, S$_{regression\ test\ case184}$, . . . , S$_{regression\ test\ casej}$, . . . S$_{regression\ test\ case7}$, S$_{regression\ test\ case4}$, S$_{regression\ test\ case5}$, S$_{regression\ test\ case3}$, S$_{regression\ test\ case185}$, . . . , S$_{regression\ test\ casek}$, . . . S$_{regression\ test\ case2}$}.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve timely detection of system faults by regression test cases. These and other embodiments can effectively improve regression testing for each product release relative to conventional approaches. For example, embodiments disclosed herein provide a method and a system for a test selection system that can evaluate the value of regression test cases, rank the regression test cases according to their respective values, and execute the regression test cases in order of value. Embodiments disclosed herein consider the number of detected faults and the priority associated with the detected faults that are linked to a regression test case, taking into account how much time has passed since the regression test case initially detected those faults. Embodiments disclosed herein value more recently detected faults higher than older detected issues. Embodiments disclosed herein provide a more optimal regression test case execution schedule by balancing how recently regression test cases have detected faults and the priority associated with those detected faults to provide an optimal testing schedule.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 3 and 4. Although described in the context of the information processing system 100, these platforms may also be used to implement at least portions of other information processing systems in other embodiments.

Figure 3:
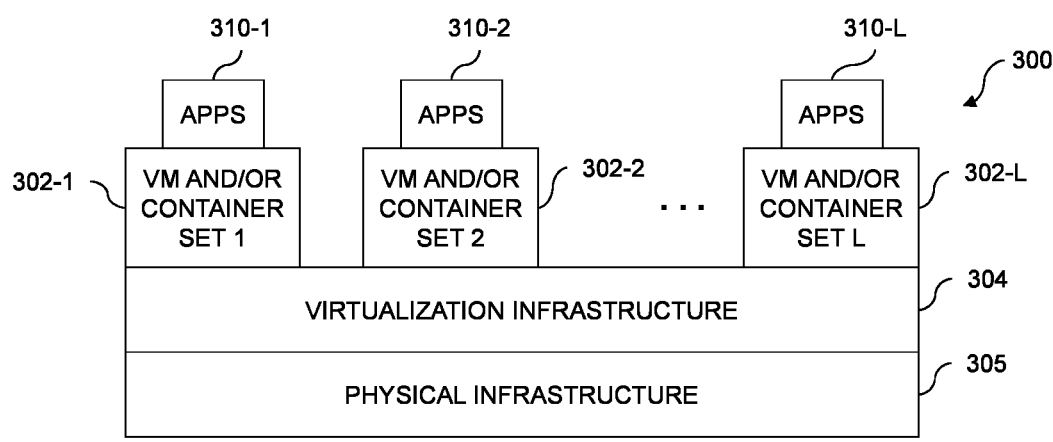
FIGS. 3 and 4 show examples of processing platforms that may be utilized to implement at least a portion of a test selection system embodiments.
Figure 4:
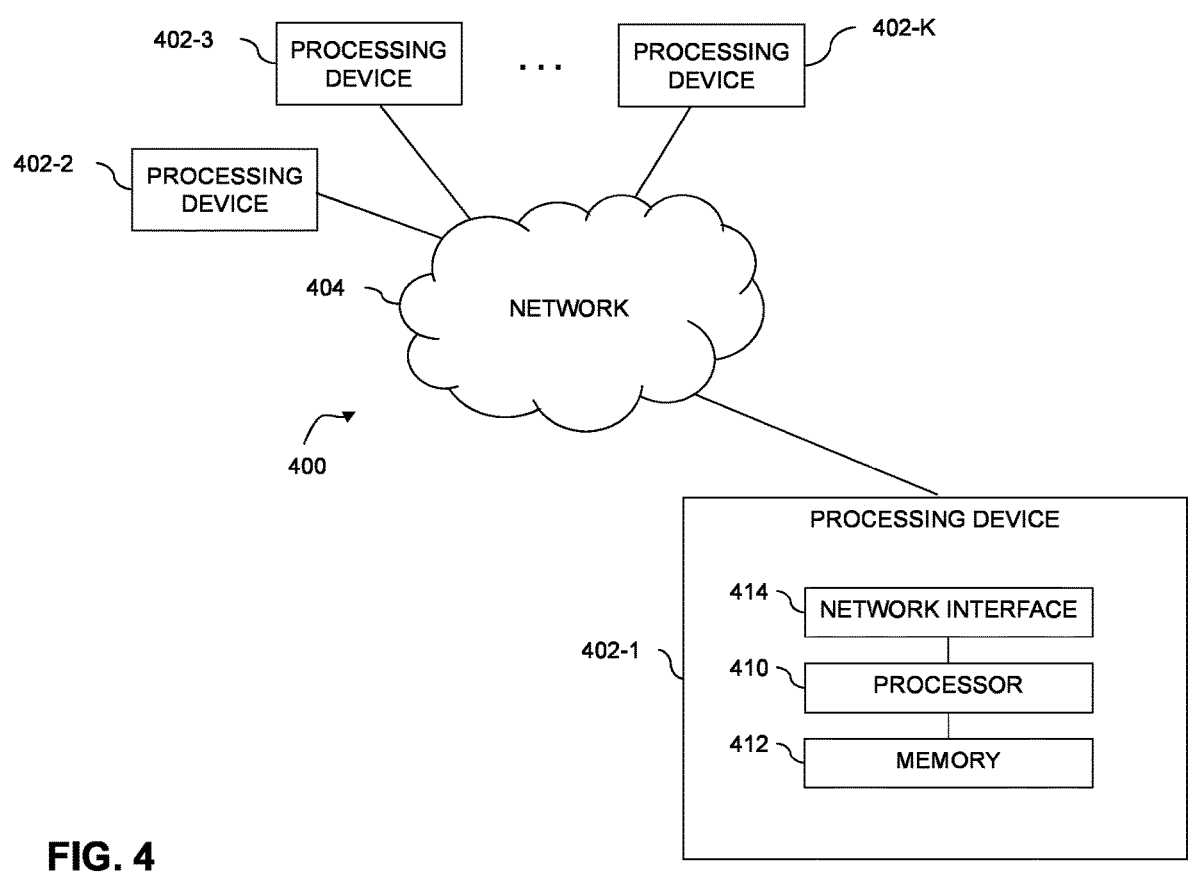

FIG. 3 shows an example processing platform comprising cloud infrastructure 300. The cloud infrastructure 300 comprises a combination of physical and virtual processing resources that are utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 comprise respective VMs, respective sets of one or more containers, or respective sets of one or more containers running in VMs. In some implementations of the FIG. 3 embodiment, the VMs/container sets 302 comprise respective VMs implemented using virtualization infrastructure 304 that comprises at least one hypervisor.

A hypervisor platform may be used to implement a hypervisor within the virtualization infrastructure 304, where the hypervisor platform has an associated virtual infrastructure management system. The underlying physical machines comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the information processing system 100 and includes a plurality of processing devices, denoted 402-1, 402-2, 402-3, . . . 402-K, which communicate with one another over a network 404.

The network 404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 402-1 in the processing platform 400 comprises a processor 410 coupled to a memory 412.

The processor 410 comprises a microprocessor, a microcontroller, an application-specific integrated circuit (ASIC), a field-programmable gate array (FPGA) or other type of processing circuitry, as well as portions or combinations of such circuitry elements.

The memory 412 comprises random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   selecting, by a test selection system, a regression test case from a plurality of regression test cases in a software testing lifecycle system;
   calculating a fault detection score for the regression test case, based on a fault detection decay rate score associated with the regression test case;
   selecting the regression test case for execution on a test system based on the fault detection score; and
   executing the regression test case on the test system, wherein the method is implemented by at least one processing device comprising a processor coupled to a memory.

2. The method of claim 1 wherein a previous execution of the regression test case on a first system detected at least one fault on the first system.

3. The method of claim 1 wherein calculating the fault detection score for the regression test case comprises:
   assigning the regression test case to a first priority plurality of regression test cases if the regression test case is associated with a new feature fault detection tag; and
   assigning the regression test case to a second priority plurality of regression test cases if the regression test case is not associated with the new feature fault detection tag.

4. The method of claim 1 wherein calculating the fault detection score for the regression test case comprises:
   determining a plurality of detected faults associated with the regression test case; and
   calculating the fault detection score using the plurality of detected faults.

5. The method of claim 4 wherein the plurality of detected faults is associated with a validation period.

6. The method of claim 4 wherein calculating the fault detection score using the plurality of detected faults comprises:
   calculating the fault detection decay rate score for each of the plurality of detected faults.

7. The method of claim 6 wherein calculating the fault detection decay rate score comprises:
   calculating the fault detection decay rate score for at least one priority associated with each of the plurality of detected faults.

8. The method of claim 7 further comprising:
   calculating the fault detection decay rate score for each priority associated with each of the plurality of detected faults.

9. The method of claim 6 wherein calculating the fault detection decay rate score comprises:
   calculating the fault detection decay rate score using Newton's Law of Cooling.

10. The method of claim 9 wherein calculating the fault detection decay rate score using Newton's Law of Cooling comprises:
    calculating the fault detection decay rate score using a validation period associated with the plurality of detected faults.

11. The method of claim 10 further comprising:
    determining a fault detection time decay factor for each of the plurality of detected faults.

12. The method of claim 11 further comprising:
    determining a summation of the fault detection time decay factor for each of the plurality of detected faults to determine the fault detection score for the regression test case.

13. The method of claim 1 wherein selecting the regression test case for execution on the test system based on the fault detection score comprises:
    ranking a first priority plurality of regression test cases according to a respective fault detection score associated with each of the first priority plurality of regression test cases to determine an execution priority associated with each of the first priority plurality of regression test cases.

14. The method of claim 1 wherein selecting the regression test case for execution on the test system based on the fault detection score comprises:
    ranking a second priority plurality of regression test cases according to a respective fault detection score associated with each of the second priority plurality of regression test cases to determine an execution priority associated with each of the second priority plurality of regression test cases.

15. The method of claim 1 wherein executing the regression test case on the test system comprises:
    executing a first priority plurality of regression test cases according to an execution priority associated with each of the first priority plurality of regression test cases; and
    upon completion of the execution of the first priority plurality of regression test cases, executing a second priority plurality of regression test cases according to an execution priority associated with each of the second priority plurality of regression test cases.

16. The method of claim 15 wherein the first priority plurality of regression test cases is associated with a first validation period and the second priority plurality of regression test cases is associated with a second validation period.

17. The method of claim 16 wherein the first validation period is different from the second validation period.

18. The method of claim 15 wherein the execution priority associated with each of the first priority plurality of regression test cases optimizes efficient fault detection on the test system.

19. A system comprising:
    at least one processing device comprising a processor coupled to a memory;
    the at least one processing device being configured:
       to select, by a test selection system, a regression test case from a plurality of regression test cases in a software testing lifecycle system;
       to calculate a fault detection score for the regression test case, based on a fault detection decay rate score associated with the regression test case;
       to select the regression test case for execution on a test system based on the fault detection score; and
       to execute the regression test case on the test system.

20. A computer program product comprising a non-transitory processor-readable storage medium having stored therein program code of one or more software programs, wherein the program code when executed by at least one processing device causes said at least one processing device:
    to select, by a test selection system, a regression test case from a plurality of regression test cases in a software testing lifecycle system;
    to calculate a fault detection score for the regression test case, based on a fault detection decay rate score associated with the regression test case;
    to select the regression test case for execution on a test system based on the fault detection score; and
    to execute the regression test case on the test system.

* * * * *